United States Patent [19]
Mukai

[11] Patent Number: 5,446,709
[45] Date of Patent: Aug. 29, 1995

[54] IMAGE FILING APPARATUS
[75] Inventor: Hachiro Mukai, Kanagawa, Japan
[73] Assignee: Fuji Photo Film Co., Ltd., Kanagawa, Japan
[21] Appl. No.: 173,867
[22] Filed: Dec. 23, 1993

Related U.S. Application Data

[63] Continuation of Ser. No. 978,163, Nov. 17, 1992, abandoned, which is a continuation of Ser. No. 642,589, Jan. 17, 1991, abandoned.

[30] Foreign Application Priority Data

Jan. 17, 1990 [JP] Japan .................... 2-7328

[51] Int. Cl.$^6$ .................. G11B 17/22; G06F 15/00
[52] U.S. Cl. .................... 369/32; 369/58; 364/413.13
[58] Field of Search .................. 369/32, 47, 48, 54, 369/58, 124; 358/296, 302, 342, 345, 347, 322, 332, 401, 256, 257; 364/413.13; 360/33.1

[56] References Cited

U.S. PATENT DOCUMENTS

| | | | |
|---|---|---|---|
| 4,705,953 | 11/1987 | Kimura et al. | 250/484.1 |
| 4,768,099 | 8/1988 | Mukai | 358/257 |
| 5,001,569 | 3/1991 | Shigyo | 358/296 |
| 5,019,975 | 5/1991 | Mukai | 364/413.13 |
| 5,261,048 | 11/1993 | Matsumoto et al. | 395/164 |

FOREIGN PATENT DOCUMENTS 63-22068  9/1988  Japan .

Primary Examiner—Georgia Y. Epps
Assistant Examiner—Nabil Hindi
Attorney, Agent, or Firm—Sughrue, Mion, Zinn, Macpeak & Seas

[57] ABSTRACT

An image filing apparatus comprises a drive device which is loaded with an optical disk capable of storing a plurality of signals, and with which image signals representing images and subsidiary information belonging to each of the images are stored on the optical disk and read therefrom. When the image signals and the subsidiary information corresponding to each of the image signals are stored on the optical disk loaded into the drive device, a data base constructing device constructs an image signal retrieving data base from the subsidiary information such that an image signal corresponding to the subsidiary information may be retrieved. A storage device stores the data base such that it can be rewritten. A judgment device for determining whether construction of a data base is to be allowed or prevented finds the type of an optical disk loaded into the drive device. In the course of storing an image signal and the subsidiary information corresponding to the image signal on the optical disk loaded into the drive device, the judgment device makes a judgment from the found type of the optical disk as to whether construction of a data base from the subsidiary information corresponding to the image signal is to be allowed or prevented.

6 Claims, 4 Drawing Sheets

FIG.2

| NO. | FRONT (A) REAR (B) | DISK NO. | DATE OF OPENING | DATE OF CLOSING |
|---|---|---|---|---|
| 1 | A | OD0001A | 89.01.05 | 89.02.19 |
| 1 | B | OD0001B | 89.01.05 | |
| 2 | A | OD0002A | 89.01.05 | 99.99.99 |
| 2 | B | OD0002B | 89.01.05 | |
| 3 | A | OD0003A | 89.02.03 | |
| 3 | B | OD0003B | 89.02.03 | |
| 4 | A | ODWK01A | 89.03.12 | |
| 4 | B | ODWK01B | 89.03.12 | |
| n | B | | | |

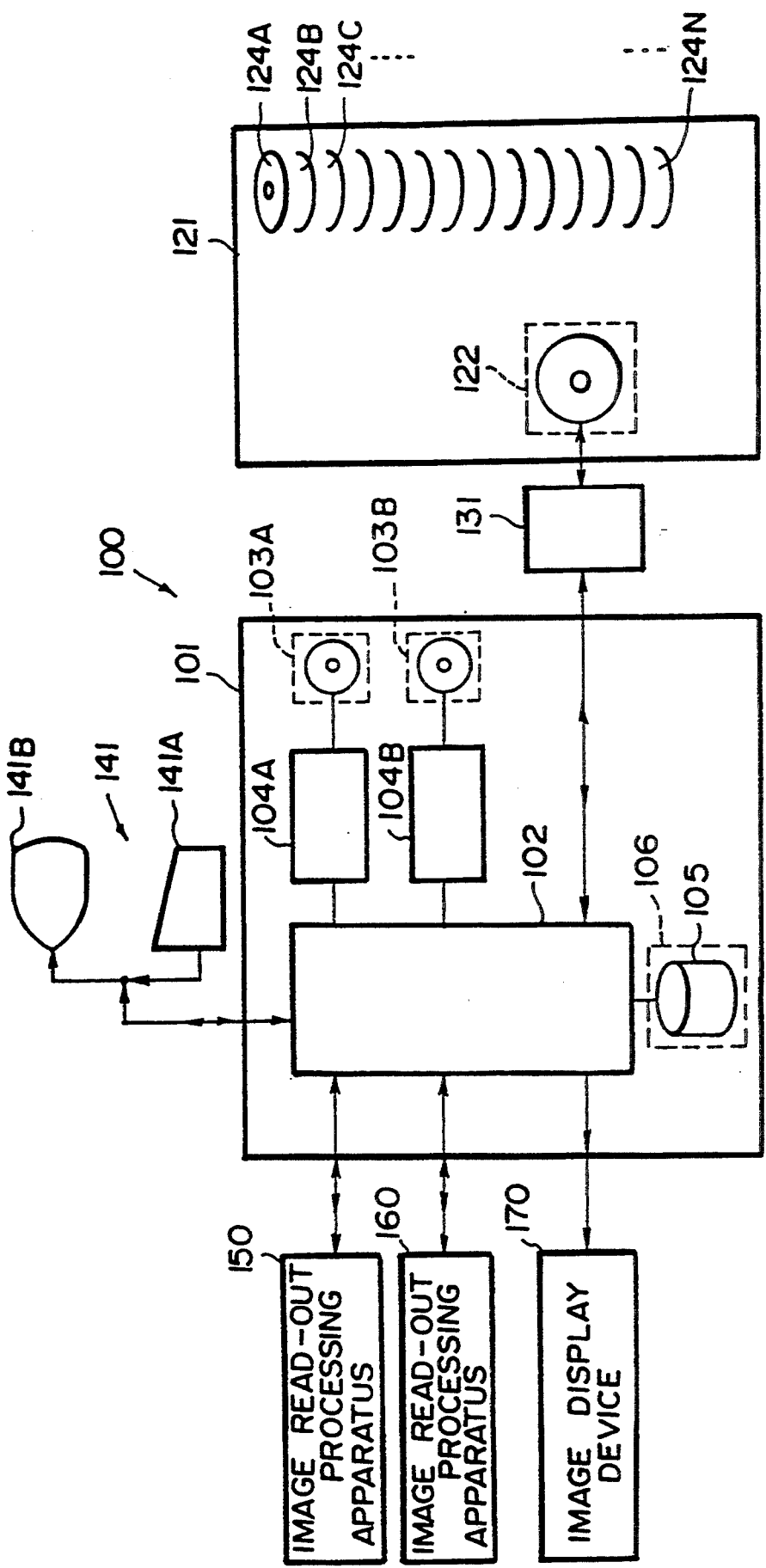

IMAGE FILING APPARATUS

This is a Continuation of applicaiton Ser. No. 07/978,163 now abandoned filed Nov. 11, 1992, which is a continuation of application Ser. No. 07/642,589 filed Jan. 17,1991 now abandoned.

BACKGROUND OF THE INVENTION

1. Field of the Invention

This invention relates to an image filing apparatus wherein image signals, which represent images, and subsidiary information belonging to each of the images are stored on an optical disk, an image signal retrieving data base is constructed from the subsidiary information such that an image signal corresponding to the subsidiary information may be retrieved, and the image signal retrieving data base is used during the retrieval of the image signals.

2. Description of the Prior Art

Image filing apparatuses for filing image signals, which represent images, have heretofore been used in various fields. For example, at medical facilities, such as hospitals, many kinds of medical images are utilized for medical treatment or research. Most of the medical images are radiation images. In recent years, many computed tomography (CT) images, magnetic resonance (MR) images, and the like, are also utilized.

The medical images should be stored to permit investigation of changes in diseases or injuries of patients, and it is legally stipulated that the medical images must be stored for a predetermined period. Therefore, in hospitals, or the like, the number of stored medical images increases daily. The medical images have heretofore been stored in the form of hard copies. However, storage as hard copies requires a large storage space and burdensome operations for control and retrieval of the medical images in hospitals, or the like.

Accordingly, in recent years, an image filing apparatus has been proposed in which images, such as medical images, are retrievably stored (i.e. filed) as image signals on a storage medium. In cases where the medical images are filed in this manner on the storage medium, the space requirement and the burden of image storage can be reduced, and the images can be retrieved easily and quickly.

In the image filing apparatus for filing the image signals in the manner described above, a data base is constructed from subsidiary information corresponding to each of the image signals and is used during the retrieval of the image signals.

The amount of the image signals representing each medical image is very large, and therefore an optical disk, which has a very large storage capacity, is generally used as the storage medium for storing the image signals. On the other hand, as the storage medium for storing an image signal retrieving data base, a storage means, such as a magnetic disk, may be utilized. Though the storage capacity of the storage means, such as a magnetic disk, is small, information can be rewritten on the storage means and can be quickly retrieved therefrom.

Ordinarily, when an image signal is stored on an optical disk, subsidiary information corresponding to the image signal is automatically added to the image signal retrieving data base, which has already been stored on a storage means. By using the data base, the image signal can be retrieved.

However, it often occurs that a test image signal other than image signals, which are to be filed during normal filing operations of an image filing apparatus, is tentatively stored on an optical disk during, for example, test runs or maintenance of the image filing apparatus. Also, it often occurs that, in cases where several persons use a single image filing apparatus, one of the persons stores an image signal for his researches, or the like, other than image signals, which are to be filed during normal filing operations of the image filing apparatus, on his optical disk.

In cases where an image signal for tests, researches, or the like is stored on an optical disk, if subsidiary information corresponding to the image signal is automatically added to a data base, the resulting data base will include the unnecessary information. Therefore, problems occur in that part of the memory, which stores the data base, is occupied by the unnecessary information. Also, a long time is taken for image retrieval to be carried out.

In order for the aforesaid problems to be eliminated, when an image signal is stored on an optical disk, an instruction designating whether a data base is to be or is not to be constructed for the image signal may be entered from, for example, a keyboard. However, in cases where it is set manually whether a data base is to be or is not to be constructed for an image signal, the problems described below occur. Specifically, when an image signal, for which a data base is to be constructed, is stored on an optical disk, an instruction designating the construction of a data base is not entered by mistake. Also, manual operations for entering such instructions are troublesome.

SUMMARY OF THE INVENTION

The primary object of the present invention is to provide an image filing apparatus, wherein only the necessary data base is constructed automatically, and no data base is constructed when an image signal, for which no data base need be constructed, for example, a test image signal or an image signal for personal researches, is stored on an optical disk.

Another object of the present invention is to provide an image filing apparatus, which enables image signals to be retrieved quickly.

The present invention provides an image filing apparatus provided with:

i) a drive means which is loaded with an optical disk capable of storing a plurality of signals, and with which image signals representing images and subsidiary information belonging to each of the images are stored on the optical disk and read therefrom, ii) a data base constructing means with which, when the image signals and the subsidiary information corresponding to each of the image signals are stored on the optical disk loaded into the drive means, an image signal retrieving data base is constructed from the subsidiary information such that an image signal corresponding to the subsidiary information may be retrieved, and iii) a storage means which stores the data base such that it can be rewritten, wherein the improvement comprises the provision of a judgment means for determining whether construction of a data base is to be allowed or prevented, which judgment means finds the type of an optical disk loaded into said drive means and, in the course of storing an image signal and the subsidiary information corresponding to said image signal on said optical disk loaded into said drive means, makes a judgment from the found type of said optical disk as to whether construction of a data base from said subsidiary information corresponding to said image signal is to be allowed or prevented.

Optical disks are classified into types in accordance with, for example, their applications (ordinary optical disks for storing image signals, work optical disks, and the like). By way of example, classification is carried out in terms of identification numbers or names, which are given to the optical disks such that they can be discriminated from one another.

The image filing apparatus in accordance with the present invention is provided with the judgment means for determining whether construction of a data base is to be allowed or prevented. The judgment means finds the type of an optical disk, which has been loaded into the drive means. In the course of storing an image signal and the subsidiary information corresponding to the image signal on the optical disk, which has been loaded into the drive means, a judgment is made from the found type of the optical disk as to whether construction of a data base from the subsidiary information corresponding to the image signal is to be allowed or prevented. Therefore, with the image filing apparatus in accordance with the present invention, only the necessary data base is constructed automatically, and no data base is constructed when an image signal, for which no data base need be constructed, is stored on an optical disk. Accordingly, it is unnecessary for an operator to carry out troublesome operations for entering an instruction, which designates whether a data base is to be or is not to be constructed, for each of image signals. Also, the problem can be prevented from occurring in that, when an image signal, for which a data base is to be constructed, is stored on an optical disk, an instruction designating the construction of a data base is not entered by mistake. Additionally, the problem can be prevented from occurring in that an unnecessary data base is constructed, and the storage space is occupied by such an unnecessary data base. Moreover, the problem can be prevented from occurring in that the data base becomes complicated, and a long time is taken for image signals to be retrieved.

As described above, with the image filing apparatus in accordance with the present invention, whether construction of a data base is to be allowed or prevented is determined in accordance with the type of the optical disk (for example, in accordance with whether the optical disk is the ordinary one for storing image signals or a work optical disk). During normal operations of the image filing apparatus, an optical disk for storing image signals is loaded into the drive means. An image signal is stored on the optical disk, and a data base is constructed for the image signal. When the image filing apparatus is to be, for example, maintained, an optical disk for maintenance is loaded into the drive means, and an image signal representing a trial image for maintenance, or the like, is stored on the optical disk. In such cases, construction of a data base is prevented from being carried out. This also applies when an image signal, for which no data base need be constructed, such as an image signal for personal researches, is stored on an optical disk.

BRIEF DESCRIPTION OF THE DRAWINGS

FIG. 2 is an explanatory view showing an example of a disk file, FIG. 4 is a schematic view showing an example of the image filing and reproducing system provided with another embodiment of the image filing apparatus in accordance with the present invention.

DESCRIPTION OF THE PREFERRED EMBODIMENTS

The present invention will hereinbelow be described in further detail with reference to the accompanying drawings.

Figure 1:
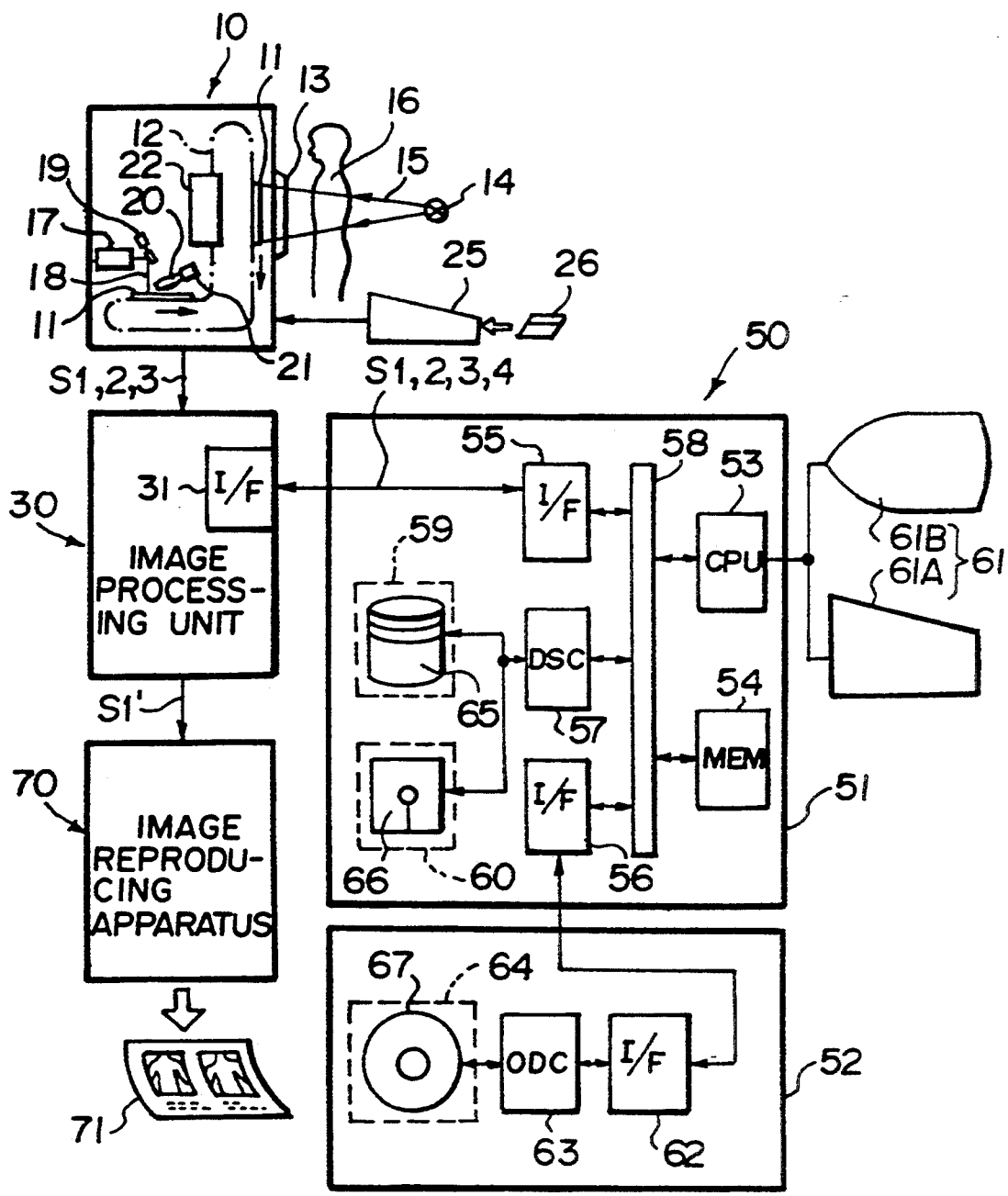
FIG. 1 is a schematic view showing an example of the image filing and reproducing system provided with an embodiment of the image filing apparatus in accordance with the present invention.

Referring to FIG. 1, an image filing apparatus 50 is constituted of a system control device 51, and an optical disk device 52, which constitutes an example of the drive means of the image filing apparatus in accordance with the present invention. With the optical disk device 52, signals are stored on an optical disk and are read therefrom. The image filing apparatus also comprises an operating console 61 consisting of a keyboard 61A and a display unit 61B. The display unit 61B may be constituted of a cathode ray tube (CRT) or the like. The image filing apparatus 50 is connected to an image processing unit 30. The image processing unit 30 receives an image signal S1 from a radiation image recording and read-out apparatus 10, which constitutes an example of an image signal source. The image processing unit 30 carries out predetermined image processing on the image signal S1, and sends an image signal S1', which has been obtained from the image processing, to an image reproducing apparatus 70.

The radiation image recording and read-out apparatus 10 may be of the type disclosed in, for example, U.S. patent application Ser. No. 755,992 or U.S. Pat. No. 4,705,953. In the radiation image recording and read-out apparatus 10, stimulable phosphor sheets 11 are conveyed and circulated along a circulation path 12. A stimulable phosphor sheet 11 is stopped at the position facing an image recording stand 13 and is exposed to radiation 15, which is produced by a radiation source 14 and which has passed through an object (patient) 16. In this manner, a radiation image of the object 16 is stored on the stimulable phosphor sheet 11. The stimulable phosphor sheet 11, on which the radiation image has been stored, is conveyed to an image read-out section and two-dimensionally scanned with a laser beam 18, which is produced by a laser beam source 17 and deflected by a light deflector 19. The laser beam 18 serves as stimulating rays. As the stimulable phosphor sheet 11 is exposed to the laser beam 18, the exposed portion of the sheet 11 emits light in proportion to the amount of energy stored thereon during its exposure to the radiation 15. The emitted light is photoelectrically detected by a photodetector 21, which is constituted of a photomultiplier or the like, via a light guide member 20. An analog output signal generated by the photodetector 21 is amplified and converted into a digital image signal S1. The digital image signal S1, which is thus obtained and which represents the radiation image of the object 16, is fed out of the radiation image recording and read-out apparatus 10. After the image read-out operation is finished in this manner, the stimulable phosphor sheet 11 is sent to an erasing section 22. At the erasing section 22, the stimulable phosphor sheet 11 is exposed to erasing light, and any energy remaining on the sheet 11 is erased to such an extent that the sheet 11 may be reused for the recording of a radiation image.

The radiation image recording and read-out apparatus 10 is connected to an ID terminal 25. At the ID terminal 25, information written on an ID card 26 for the patient 16 (hereinafter referred to as patient information) is read out. The patient information includes, for example, the name, the sex, and the date of birth of the patient. Also, information about characteristics of the recorded radiation image (hereinafter referred to as image characteristics information) is entered at the ID terminal 25. The image characteristics information includes, for example, the image number, the date on which the image was recorded, the portion of the object the image of which was recorded, the size of the recorded image, and the sensitivity with which the image is read out. The patient information S2 and he image characteristics information S3 are fed to the image processing unit 30 together with the image signal S1. In this embodiment, the patient information S2, the image characteristics information S3, and other accompanying information constitute an example of the subsidiary information in the image filing apparatus in accordance with the present invention.

The image processing unit 30 can carry out, for example, at least 20 types of gradation processes and at least 10 types of frequency response processes on the image signal S1. The image processing conditions are tabulated, and optimal image processing conditions are automatically selected from the table in accordance with the characteristics of the recorded radiation image, which are designated at the ID terminal 25. The image signal Si', which is obtained by carrying out image processing under optimal conditions in the image processing unit 30, is sent to the image reproducing apparatus 70.

By way of example, the image reproducing apparatus 70 is composed of a light beam scanning and recording apparatus for two-dimensionally scanning photographic film with a light beam, which has been modulated in accordance with the image signal S1', and an automatic developing machine for developing the film, which has been exposed to the light beam. With the image reproducing apparatus 70, the image represented by the image signal Si', i.e. the radiation image of the patient 16, is recorded as a hard copy 71 on the photographic film.

The hard copy 71 of the radiation image, which has been formed on the photographic film in the manner described above, is utilized for making a diagnosis of the patient 16. Instead of being constituted of the light beam scanning and recording apparatus and the automatic developing machine, the image reproducing apparatus 70 may be constituted of a CRT display device, or the like.

How an image signal representing a radiation image is stored (filed) by the image filing apparatus 50 will be described hereinbelow.

The system control device 51 of the image filing apparatus 50 is constituted of a known computer system. Specifically, the system control device 51 is composed of a central processing unit (CPU) 53, a memory 54, interfaces 55 and 56, a control unit 57, a bus 58 which connects these sections, a fixed magnetic disk drive unit 59, and a floppy disk drive unit 60. The control unit 57 controls the fixed magnetic disk drive unit 59 and the floppy disk drive unit 60. The fixed magnetic disk drive unit 59 and the control unit 57 constitute an example of the storage means of the image filing apparatus in accordance with the present invention. The aforesaid keyboard 61A and the display unit 61B are connected to the CPU 53, and the interface 55 is connected to an interface 31 of the image processing unit 30. The optical disk device 52 is composed of an interface 62, which is connected to the interface 56 of the system control device 51, an optical disk drive control unit 63, and an optical disk drive unit 64. An optical disk 67 is inserted into the optical disk drive unit 64.

The subsidiary information, such as the aforesaid patient information S2 and the image characteristics information S3, is transferred from the image processing unit 30 to the system control device 51, and recorded on the fixed magnetic disk 65, which is operated by the fixed magnetic disk drive unit 59. In this manner, a data base is constructed on the fixed magnetic disk 65 from the subsidiary information. The job for constructing the data base is carried out by the CPU 53, which is shown in FIG. 1. The combination of the hardware and software functions for constructing the data base constitutes an example of the data base constructing means of the image filing apparatus in accordance with the present invention. A floppy disk 66 is operated by the floppy disk drive unit 60 and is utilized for control of system operations. The subsidiary information, such as the patient information S2 and the image recording information S3, is also transferred to the optical disk device 52, and filed on the optical disk 67 together with the image signal S1, which is transferred from the image processing unit 30. At this time, the image signal S1 by-passes the image processing section in the image processing unit 30, and is recorded on the optical disk 67 in the form of a raw signal which has not been subjected to the image processing. Also, information S4 about the image processing conditions, under which the image signal S1 is to be processed, is fed out of the image processing unit 30 and stored on the optical disk 67.

FIG. 2 shows a list of optical disks, the information about which is stored on the fixed magnetic disk 65.

When a new optical disk 67 is loaded into the optical disk drive unit 64, the optical disk 67 is initialized. Specifically, a disk number for discriminating the new optical disk 67 from the other optical disks is assigned to the new optical disk 67, and information about the disk number is recorded on the optical disk 67. Also, the disk number is registered in a disk file, which is stored on the fixed magnetic disk 65 and which will be described later. Such operations are referred to as the initialization. In this embodiment, signals can be stored on both surfaces (surfaces A and B) of the optical disk 67. The optical disk drive unit 64 can access only one surface of the optical disk 67. In order for the other surface of the optical disk 67 to be accessed, the optical disk 67 must be turned upside down. Therefore, different disk numbers are assigned to the surfaces of the optical disk 67. Accordingly, during the initialization, the new optical disk 67 is inserted into the optical disk drive unit 64, and the initialization is carried out for one surface of the optical disk 67. Thereafter, the optical disk 67 is removed from the optical disk drive unit 64, turned upside down, and inserted into the optical disk drive unit 64.

Initialization is then carried out for the other surface of the optical disk 67.

The disk file stored on the fixed magnetic disk 65 is shown in FIG. 2.

In the course of carrying out the initialization, information about whether the optical disk 67 is an image signal storing optical disk or is a work optical disk is entered from the keyboard 61A shown in FIG. 1. The term "image signal storing optical disk" as used herein means an optical disk for storing image signals detected during normal operations of the radiation image recording and read-out apparatus 10. The term "work optical disk" as used herein means an optical disk used during operations other than normal operations, for example, an optical disk for storing image signals detected tentatively with the radiation image recording and read-out apparatus 10 during the maintenance, or an optical disk for storing image signals, which are generated during personal researches other than normal diagnoses of illnesses. Disk numbers, e.g. OD0001A (front surface), OD0001B (rear surface), OD0002A (front surface), OD0002B (rear surface), . . . , are assigned to image signal storing optical disks in the order with which they are initialized. Also, disk numbers, e.g. ODWK01A (front surface), ODWK01B (rear surface), ODWK02A (front surface), ODWK02B (rear surface), . . . , are assigned to work optical disks in the order with which they are initialized. Each disk number is recorded on the corresponding front or rear surface of the corresponding optical disk which has been initialized. The disk numbers are also recorded in the disk file. After the disk numbers are recorded in the disk file, the corresponding optical disks, which have been initialized, are controlled by the image filing apparatus 50.

In FIG. 2, disk numbers have been registered for No. 1 through No. 4 optical disks. As illustrated, No. 1, No. 2, and No. 3 optical disks are image signal storing optical disks and were initialized respectively on Jan. 5, 1989; Jan. 5, 1989; and Feb. 3, 1989. Also, the date of closing (Feb. 19, 1989) is recorded for the surface A of the No. 1 optical disk. This indicates that an image signal was recorded on Feb. 19, 1989 on the surface A of the No. 1 optical disk (disk number: OD0001A), and as a result no image signal can be recorded thereon any more (i.e. the surface A has filled). Additionally, the date of closing (99.99.99) is recorded for the surface A of the No. 2 optical disk (disk number: OD0002A). This indicates that the surface A of the No. 2 optical disk has not yet filled, but an operator entered an instruction from the keyboard 61A, which instruction designates that no image signal should be recorded any more on the surface A of the No. 2 optical disk. When the No. 2 optical disk is inserted into the optical disk drive unit 64 such that its surface A can be accessed, image signals stored on the surface A can be read, but no image signal can be directly written thereon. Because the surface A of the No. 2 optical disk has not yet filled, the date of closing can be canceled by the operator, and the recording of an image signal thereon can thereby be enabled.

In general, during the recording of image signals on optical disks, after the optical disks have filled in the order of OD0001A, OD0001B, OD0002A, OD0002B, . . . , the recording of image signals on an optical disk having the next disk number is begun. Alternatively, as illustrated in FIG. 2, a plurality of optical disks should preferably be initialized in advance, so that image signals can be recorded on any of the optical disks. In such cases, image signals may be classified into several groups in accordance with a certain criterion, e.g. the type of image signals, and different groups of image signals may be recorded on different optical disks. For example, image signals representing images of the chests of human bodies may be recorded on the No. 1 optical disk, and image signals representing the heads of human bodies may be recorded on the No. 2 optical disk.

The No. 4 optical disk is a work optical disk. In this example, the No. 4 optical disk is used for the maintenance. After the optical disk 67 is loaded into the optical disk drive unit 64, the disk number of the optical disk 67 is read, and a judgment is made as to whether the optical disk 67 is an image signal storing optical disk or a work optical disk. In cases where it has been judged that the optical disk 67 is an image signal storing optical disk, in the course of storing an image signal on the optical disk 67, a data base, which is to be used during the retrieval of the image signal, is constructed. In cases where it has been judged that the optical disk 67 is a work optical disk, construction of the data base is prevented. In such cases, a data base, which has been constructed most recently, is kept unchanged. The CPU 53 carries out the operations for finding the type of the optical disk 67 (i.e. whether it is an image signal storing optical disk or a work optical disk) and making a judgment as to whether a data base is to be or is not to be constructed. Therefore, in this embodiment, the combination of the hardware and software functions for carrying out such operations constitutes an example of the judgment means for determining whether construction of a data base is to be allowed or prevented in the image filing apparatus in accordance with the present invention.

As described above, in cases where the No. 4 optical disk is loaded into the optical disk drive unit 64, no data base is constructed. Therefore, when test runs of the image filing apparatus 50 and the apparatuses connected thereto are to be carried out, the No. 4 optical disk is loaded into the optical disk drive unit 64, so that tests in recording and reading image signals may be carried out without unnecessary data base being constructed.

After test runs are finished, in lieu of the work optical disk, an image signal storing optical disk (one of the No. 1, No. 2, and No. 3 optical disks) may be inserted into the optical disk drive unit 64, such that, in the course of storing an image signal on the optical disk, a data base corresponding to the image signal may be constructed automatically.

Figure 3:
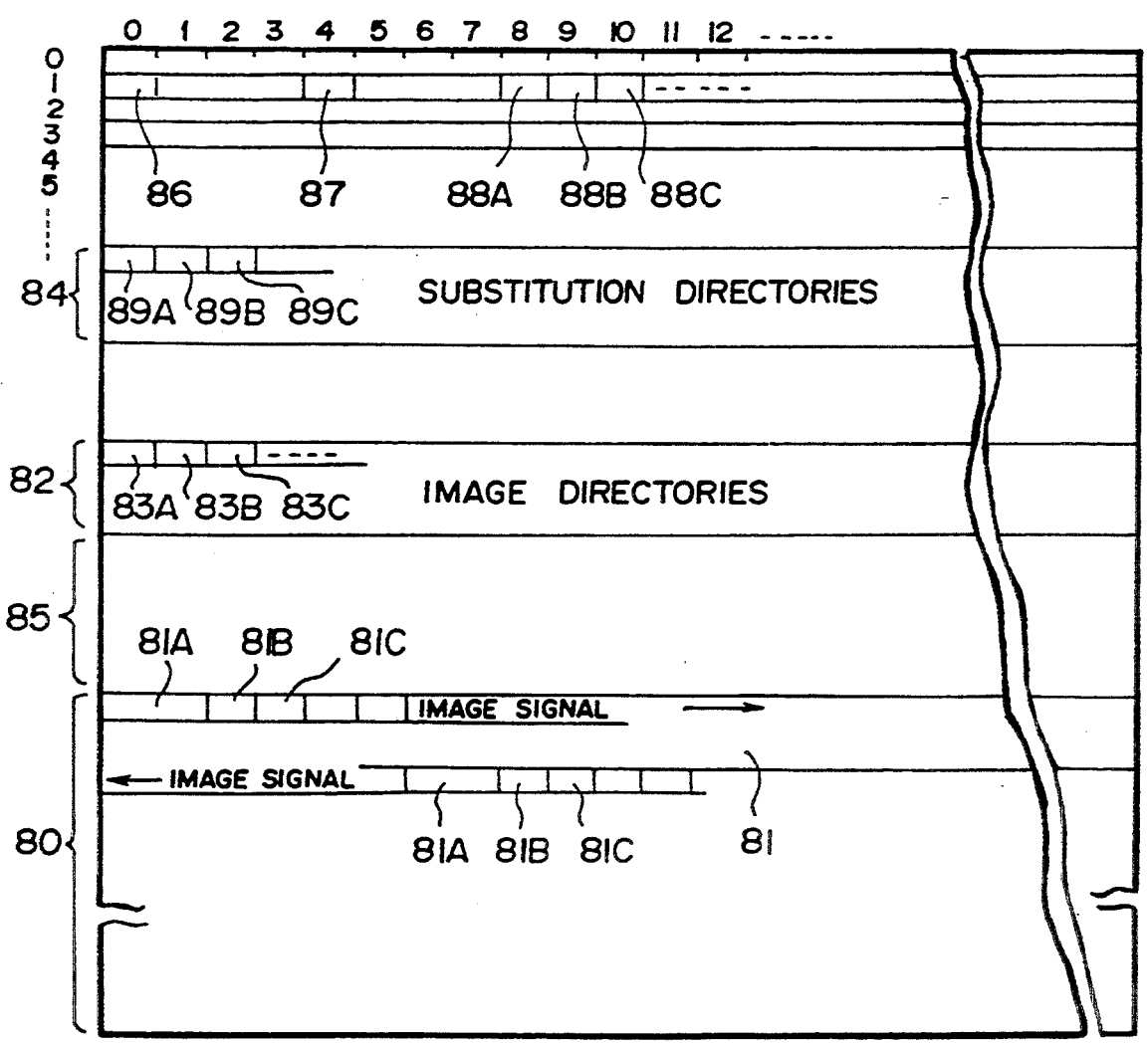
FIG. 3 is an explanatory view showing an example of the recording format on an optical disk.

FIG. 3 is an explanatory view showing an example of the recording format on the optical disk 67. How the image signal S1 and the subsidiary information, such as the patient information S2 and the image characteristics information S3, are recorded on the optical disk 67 will hereinbelow be described in detail with reference to FIG. 3.

In FIG. 3, each graduation along the vertical axis indicates a single track on the optical disk 67, and each graduation along the horizontal axis indicates a single sector. Image signals are recorded in units of a single image in an image signal recording region 80, which is sufficiently broadly formed on the optical disk 67. A header 81A and blocks 81B and 81C are located before and after an image signal area 81, in which an image signal representing a single image is recorded. The subsidiary information, such as the patient information S2 and the image characteristics information S3, corresponding to an image signal S1, which represents a single image and which is recorded in the image signal area 81, is recorded in the header 81A. The information S4 about the image processing conditions, which are to be used in the image processing unit 30, is recorded in the blocks 81B and 81C.

When the image signal S1 has been recorded in the image signal area 81 on the optical disk 67 in the manner described above, one of the image directories 83A, 83B, 83C, ... that corresponds to the image signal S1, which has been recorded in the image signal area 81, is recorded in an image directory region 82. Basically, in each of the image directories 83A, 83B, 83C, ..., the head address of the header 81A for the image signal S1, which has been recorded in the image signal area 81, the sector length of the image signal S1, and characteristic information about the image signal S1 are recorded.

The optical disk 67 is also provided with a region 84 for forming substitution directories 89A, 89B, 89C, ..., which are used for substitution of the image directories 83A, 83B, 83C, ... when they are changed. The optical disk 67 is further provided with a region 85 for forming directories of new recorded signals representing information about a diagnosis card, or the like. Also, blocks 86 and 87 and a plurality of directory entry blocks 88A, 88B, 88C, ... are formed on the first track of the optical disk 67. In the block 86, information about the disk number is recorded. The block 87 is used to indicate that the optical disk 67 has filled with information. The first directory entry block 88A is used for indicating that a group of the image directories 83A, 83B, 83C, ... has been formed. The head address and the sector length of the image directory group (i.e. the group of directories formed in the image directory region 82) are recorded in the first directory entry block 88A. In the second directory entry block 88B, the head address and the sector length of the substitution directory group (89A, 89B, 89C, ... ) are recorded. Also, the third directory entry block 88C and the subsequent directory entry blocks are formed for recording head addresses and sector lengths of directory groups for the future.

In the manner described above, the image signal S1 and the information accompanying the image signal S1 (such as the patient information S2, the image characteristics information S3, and the information S4 about the image processing conditions) are sequentially recorded in units of a single image on the optical disk 67. In order that the number of image signals capable of being filed on the optical disk 67 may be kept large, the image signals should preferably be compressed by a known image signal compression technique, and the compressed image signals should be recorded on the optical disk 67. Very large amounts of image signals are recorded on the optical disk 67 in addition to the patient information S2, the image characteristics information S3, and the information S4 about the image processing conditions. If an image signal compression technique is applied, image signals representing approximately 1,000 images can be filed on a single optical disk 67. On the other hand, the recording capacity of the fixed magnetic disk 65 is smaller than the recording capacity of the optical disk 67. However, only the subsidiary information, such as the patient information S2 and the image characteristics information S3, is recorded on the fixed magnetic disk 65. Therefore, by way of example, the subsidiary information corresponding to approximately 1,000,000 images can be filed on the fixed magnetic disk 65.

How an image signal is retrieved and a visible image is reproduced from the retrieved image signal will now be described below.

As described above, the data base for image signal retrieval has been constructed on the magnetic disk 65 shown in FIG. 1. An operator operates the keyboard 61A to enter the desired subsidiary information, using the display unit 61B of the operating console 61. The system control device 51 retrieves image signals corresponding to the entered subsidiary information from the data base constructed on the magnetic disk 65, and displays a list of the image signals on the display unit 61B. Basically, as the subsidiary information, all items of the patient information S2 and the image characteristics information S3 can be used. For example, when the name of a patient, which is one item of the patient information S2, is designated as the subsidiary information, an image signal list is displayed on the display unit 61B, which image signal list indicates the image signal numbers of all images of the designated patient, the patient information S2 other than the name of the patient, and the image characteristics information S3. The operator selects a desired image signal from the displayed image signal list, and reserves the reproduction of the image from the image signal. Information about the reserved image signal number is stored in the memory 54. In this manner, the image signal retrieval operation can be carried out independently even though the image processing unit 30 and the image reproducing apparatus 70 are in operation for reproducing an image from the image signal S1, which is received from the radiation image recording and read-out apparatus 10. Also, even if the image signal to be retrieved is one recorded on an optical disk other than the optical disk 67 that is in the optical disk device 52 at the time of the image signal retrieval, the retrieval operation carried out as described above does not become invalid. After the aforesaid reservation was carried out, image reproduction can be carried out when the optical disk, on which the reserved image signal is recorded, is inserted into the optical disk device 52.

When information indicating the cessation of the operation of the image processing unit 30 is entered into the system control device 51 after the aforesaid reservation, the system control device 51 activates the optical disk device 52 to read the reserved image signal from the optical disk 67. In the course of reading the reserved image signal from the optical disk 67, an instruction designating the reading of the image directory group in the region 82 is given with the first directory entry block 88A acting as a pointer, and the image directories 83A, 83B, 83C, ... are read out. Also, one of the image directories 83A, 83B, 83C, ..., in which the reserved image signal number is written, acts as a pointer, and the header 81A indicated by said image directory is designated. In this manner, the information written in the header 81A, the image signal S1 written in the image signal area 81, and the information written in the blocks 81B and 81C corresponding to the header 81A are read out.

The image signal S1 in the image signal area 81, the patient information S2 and the image characteristics information S3 in the header 81A, and the information S4 about the image processing conditions in the blocks 81B and 81C, which have been read out in the manner described above, are transferred from the system control device 51 to the image processing unit 30. The image processing unit 30 carries out image processing, such as gradation processing or frequency response processing, on the image signal S1 under the image processing conditions represented by the information S4. The image processing unit 30 feeds an image signal Si', which is obtained from the image processing, into the image reproducing apparatus 70. The image reproducing apparatus 70 reproduces a visible image from the processed image signal Si' in the same manner as that described above. In this manner, a hard copy 71 of the radiation image is formed. The patient information S2 and the image characteristics information S3 are utilized for writing the patient information and the image characteristics information on the hard copy 71.

FIG. 4 is a schematic view showing another embodiment of the image filing apparatus in accordance with the present invention.

With reference to FIG. 4, an image filing apparatus 100 comprises a system control device 101, a library device 121, an optical disk drive control device 131, and an operating console 141.

The system control device 101 is connected to image read-out and processing apparatuses 150, 160 and an image display device 170 which is provided with a CRT display device for displaying images. Image signals and accompanying information are transferred between the system control device 101 and the image read-out and processing apparatuses 150, 160 and the image display device 170.

The system control device 101 is constituted of a computer unit 102, optical disk drive units 103A, 103B, an optical disk drive control units 104A, 104B for controlling the optical disk drive units 103A, 103B, and a fixed magnetic disk drive unit 106 provided with a fixed magnetic disk 105. The library device 121 is constituted of a plurality of racks, each of which supports one of optical disks 124A, 124B, 124C, . . . , 124N, and an optical disk drive unit 122 into which one of the optical disks is inserted. The library device 121 also has a handling unit (not shown), which takes one of the optical disks 124A, 124B, 124C, . . . , 124N out of the racks, inserts the optical disk into the optical disk drive unit 122, takes the optical disk out of the optical disk drive unit 122, and moves the optical disk to one of the racks. The optical disk drive control device 131 has functions approximately identical with the functions of the optical disk drive control units 104A, 104B, which are incorporated in the system control device 101. The optical disk drive control device 131 controls the optical disk drive unit 122 located in the library device 121 and signal transmission between the optical disk drive unit 122 and the system control device 101. The operating console 141 is provided with a keyboard 141A and a display unit 141B.

The operating console 141 corresponds to the operating console 61 in the embodiment of FIG. 1. The fixed magnetic disk 105 corresponds to the fixed magnetic disk 65 shown in FIG. 1. The system control device 101 corresponds to the system control device 51 shown in FIG. 1. The library device 121 and the optical disk drive control device 131 correspond to the optical disk device 52 shown in FIG. 1. Specifically, when an image signal and corresponding subsidiary information are fed from one of the image read-out and processing apparatuses 150 and 160 into the system control device 101, the subsidiary information is recorded on the fixed magnetic disk 105, and a data base is thereby constructed thereon. Also, the image signal and the subsidiary information are fed into the library device 121 and stored on the optical disk, which has been inserted into the optical disk drive unit 122.

Some of the optical disks 124A, 124B, 124C, . . . , 124N accommodated in the library device 121 are of the type storing image signals, and the other are work optical disks. In the same manner as that in the embodiment of FIG. 1, disk numbers are used to discriminate between the image signal storing optical disks and the work optical disks. When an image signal is stored on the optical disk, construction of a data base corresponding to the image signal is allowed or prevented in accordance with whether the optical disk, which has been inserted into the optical disk drive unit 122, is an image signal storing optical disk or a work optical disk. As described above for the embodiment of FIG. 1, some of the optical disks 124A, 124B, 124C, . . . , 124N accommodated in the library device 121 may be initialized in advance. Thereafter, the optical disks may be classified in accordance with the characteristics of images, such as the portion of an object (e.g. the chest or the abdomen of a human body) the image of which was recorded and the branch of medicine (e.g. internal medicine or surgery) for which the image is used.

In the aforesaid embodiments, image signals representing radiation images are filed. However, the image filing apparatus in accordance with the present invention is also applicable when image signals representing other kinds of medical images, such as CT images and MR images, and general types of images are filed.

I claim:

1. An image filing apparatus provided with:
   i) a drive means which is loaded with an optical disk for storing a plurality of signals, and on which image signals representing images and subsidiary information belonging to each of the images are stored and read therefrom,
   ii) a data base constructing means which, when the image signals and the subsidiary information corresponding to each of the image signals are stored on the optical disk loaded into the drive means, constructs an image signal retrieving data base from the subsidiary information such that the image signals corresponding to the subsidiary information are available for retrieval after the image signals are stored on the optical disk, and
   iii) a storage means which stores said image signal retrieving data base such that said image signal retrieving database can be revised,
   wherein the improvement comprises:
      classification means for determining a loaded optical disk classification of said optical disk loaded into said drive means,
      an automatic judgment means for automatically judging if an image signal retrieving data base is to be constructed by said data base constructing means depending on said loaded optical disk classification, and
      an interconnecting means comprising a drive means interface and a data base constructing means interface which interconnects said drive means and said data base constructing means,
   wherein, if said automatic judgment means judges that a first type of optical disk is loaded in said drive means, said data base constructing means constructs said image signal retrieving data base, and if said automatic judgment means judges that a second type of optical disk is loaded in said drive means, said data base constructing means is prevented from constructing said image signal retrieving data base.

2. An apparatus as defined in claim 1 wherein said images are medical images.

3. An apparatus as defined in claim 1 wherein said images are radiation images.

4. An apparatus as defined in claim 3 wherein said radiation images are medical images, and said subsidiary information includes information about patients and characteristics of images.

5. An apparatus as defined in claim 3 wherein each said radiation image is stored on a stimulable phosphor sheet, and an image signal representing each said radiation image is obtained by exposing the stimulable phosphor sheet to stimulating rays, which cause it to emit light in proportion to the amount of energy stored thereon during its exposure to radiation, and photoelectrically detecting the emitted light.

6. An apparatus as defined in claim 1 wherein said first type of optical disk is an image signal storing optical disk and said second type of optical disk is a work optical disk.

* * * * *